US008425043B2

United States Patent
Miyazawa

(10) Patent No.: US 8,425,043 B2
(45) Date of Patent: Apr. 23, 2013

(54) PROJECTOR HAVING A PLURALITY OF OPTICAL DEVICES WITH A PURALITY OF OPTICAL MODULATORS

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 12/709,082

(22) Filed: Feb. 19, 2010

(65) Prior Publication Data

US 2010/0225885 A1 Sep. 9, 2010

(30) Foreign Application Priority Data

Mar. 3, 2009 (JP) ................................. 2009-048911

(51) Int. Cl.
| | |
|---|---|
| G03B 21/00 | (2006.01) |
| G03B 21/14 | (2006.01) |
| G03B 21/26 | (2006.01) |
| G02B 27/26 | (2006.01) |
| G02F 1/00 | (2006.01) |
| G02F 1/1335 | (2006.01) |
| H04N 5/74 | (2006.01) |
| H04N 9/47 | (2006.01) |
| H04N 9/69 | (2006.01) |
| H04N 13/04 | (2006.01) |

(52) U.S. Cl.
USPC ........ 353/20; 353/7; 353/31; 353/34; 353/94; 348/58; 348/750; 348/757; 349/9; 359/465

(58) Field of Classification Search ............ 353/7–8, 353/20, 94, 30–31, 33–34, 48, 82; 359/462, 359/464–465; 348/42, 51, 54, 58, 60, 750–751, 348/756–757; 349/5, 8–9
See application file for complete search history.

(56) References Cited

U.S. PATENT DOCUMENTS

| | | | | |
|---|---|---|---|---|
| 4,995,718 | A | * | 2/1991 | Jachimowicz et al. ......... 353/31 |
| 5,172,254 | A | * | 12/1992 | Atarashi et al. .................... 349/9 |
| 6,513,934 | B1 | * | 2/2003 | Okuyama ....................... 353/31 |
| 6,672,722 | B2 | * | 1/2004 | O'Connor et al. ............... 353/34 |
| 7,270,416 | B2 | | 9/2007 | Yamanaka et al. |
| 7,287,861 | B2 | | 10/2007 | Nakayama |
| 7,471,822 | B2 | * | 12/2008 | Roth et al. ..................... 382/162 |
| 7,872,216 | B2 | * | 1/2011 | Miyazawa ................... 250/208.1 |
| 7,918,560 | B2 | * | 4/2011 | Miyazawa ....................... 353/20 |
| 7,959,299 | B2 | * | 6/2011 | Miyazawa ....................... 353/34 |

(Continued)

FOREIGN PATENT DOCUMENTS

| | | | |
|---|---|---|---|
| JP | A 3-150553 | | 6/1991 |
| JP | 03294841 A | * | 12/1991 |

(Continued)

*Primary Examiner* — Tony Ko
*Assistant Examiner* — Jori S Reilly-Diakun
(74) *Attorney, Agent, or Firm* — Oliff & Berridge, PLC

(57) ABSTRACT

A projector includes: a first optical device, and a first color combining optical device; a second optical device, and a second color combining optical device; a combining optical device adapted to combine emission light emitted respectively from the first optical device and the second optical device; a first polarization conversion device disposed between the first optical device and the combining optical device, and adapted to align a polarization direction of the emission light from the first optical device into a first polarization direction; and a second polarization conversion device disposed between the second optical device and the combining optical device, and adapted to align a polarization direction of the emission light from the second optical device into a second polarization direction.

7 Claims, 7 Drawing Sheets

U.S. PATENT DOCUMENTS

| | | | |
|---|---|---|---|
| 8,177,371 B2 * | 5/2012 | Nagai | 353/33 |
| 2004/0114239 A1 * | 6/2004 | Sedlmayr | 359/485 |
| 2006/0197914 A1 * | 9/2006 | Robinson | 353/20 |
| 2008/0259231 A1 * | 10/2008 | Miyazawa | 349/8 |
| 2010/0182519 A1 * | 7/2010 | Nagatsu et al. | 349/5 |
| 2010/0238411 A1 * | 9/2010 | Tanaka | 353/31 |
| 2011/0188005 A1 * | 8/2011 | Miyazawa et al. | 353/58 |

FOREIGN PATENT DOCUMENTS

| | | |
|---|---|---|
| JP | B2 7-52262 | 6/1995 |
| JP | A 2001-154268 | 6/2001 |
| JP | 2003-029238 | 1/2003 |
| JP | 2005-241870 | 9/2005 |
| JP | 2005-283658 | 10/2005 |
| JP | A 2005-283663 | 10/2005 |

* cited by examiner

PROJECTOR HAVING A PLURALITY OF OPTICAL DEVICES WITH A PURALITY OF OPTICAL MODULATORS

BACKGROUND

1. Technical Field

The present invention relates to a projector provided with two or more optical devices, and combining the light emitted from the respective optical devices to display an image.

2. Related Art

In the past, there has existed a projector provided with an optical device for separating the light emitted from a light source into three colored light of red (R), green (G), and blue (B), performing light modulation on the colored light using respective liquid crystal panels, and then combining the colored light, on which the light modulation has been performed, to emit it therefrom. Further, there has been known a projector provided with two such optical devices, and combining the light emitted from the respective optical devices to emit the combined light (see, e.g., JP-A-7-52262 (Document 1)).

The projector described in the Document 1 is a six-panel liquid crystal projector provided with two optical devices, each having three liquid crystal panels, combined with each other. The projector splits the light from the light source into S-polarized light and P-polarized light by polarization split, and leads the S-polarized light to one of the optical devices, and the P-polarized light to the other thereof. Then, each of the optical devices separates the polarized light thus input thereto into the colored light of R, G, and B, performs light modulation on the colored light using the respective liquid crystal panels, and combines the colored light, on which the light modulation has been performed, using a dichroic mirror, thereby generating image light with respect to the respective polarized light. Further, the image light combined by the respective optical devices are combined by the polarization split, and then emitted toward a projection object such as a screen.

Incidentally, in general, the color combining optical system such as a dichroic mirror of the projector reflects the red light and the blue light, and transmits the green light therethrough, thereby combining the colored light to form the image light. Therefore, it is possible to efficiently combine the colored light to form the image light by increasing the reflectance of the red light and the blue light with respect to the color combining optical system and increasing the transmission of the green light with respect to the color combining optical system, namely by using the S-polarized light with preferable reflectance as the red light and the blue light, and the P-polarized light with preferable transmission as the green light.

However, in the projector disclosed in the Document 1 described above, the polarization directions along which the respective colored light are combined with the dichroic mirror are not considered, and therefore, it is not achievable to appropriately combine the respective colored light to thereby form the image light. For example, in the optical device to which the S-polarized light is input, all of the colored light become the S-polarized light, and the light obtained by combining these colored light of the S-polarized light with each other provides poor transmission of the green light, which makes it quite difficult to form the preferable image light.

Incidentally, in order for solving the problem described above, it is also possible to adopt the configuration of changing the polarization directions of the light using a half-wave retardation plate before the light enter the color combining optical system to set the green light to be the P-polarized light, and the red light and the blue light to be the S-polarized light. However, in such a case, the light obtained by the combining operation of each of the optical devices becomes mixed light of the P-polarized light and the S-polarized light, and therefore, loss of light intensity is caused when combining the each image light with an optical component such as a polarizing beam splitter. In the case of the optical component such as the polarizing beam splitter used in the Document 1 described above, for example, the transmission of the P-polarized light increases, and the reflectance of the S-polarized light also increases. In the case of making the mixed light of the P-polarized light and the S-polarized light enter such an optical component, the light entering from the side facing straight to the projection direction has poor transmission of the S-polarized light, and the light entering from the side perpendicular to the projection direction has poor reflectance of the P-polarized light. In other words, the loss of light intensity is caused in the optical component, and the light efficiency is degraded.

SUMMARY

In view of such a problem as described above, some aspects of the present invention have an advantage of providing a projector with preferable light efficiency.

According to an aspect of the invention, there is provided a projector including a first optical device having a plurality of first light modulation elements adapted to modulate a plurality of colored light, and a first color combining optical device adapted to combine the colored light modulated by the respective first light modulation elements, a second optical device having a plurality of second light modulation elements adapted to modulate a plurality of colored light, and a second color combining optical device adapted to combine the colored light modulated by the respective second light modulation elements, a combining optical device adapted to combine emission light emitted respectively from the first optical device and the second optical device to thereby emit the combined light in a projection direction, a first polarization conversion device disposed between the first optical device and the combining optical device, and adapted to align a polarization direction of the emission light from the first optical device into a first polarization direction, and a second polarization conversion device disposed between the second optical device and the combining optical device, and adapted to align a polarization direction of the emission light from the second optical device into a second polarization direction.

According to this aspect of the invention, the emission light emitted from the first optical device is aligned in the first polarization direction by the first polarization conversion device, and the emission light, which is emitted from the second optical device disposed so that the emission direction of the light is perpendicular to the projection direction, is aligned in the second polarization direction by the second polarization conversion device. Here, when performing the color combining process, the first and the second color combining optical devices of the first and second optical devices reflect or transmit the respective colored light, and in this case, the combining process of the colored light is performed by transmitting the P-polarized light with preferable transmission and reflecting the S-polarized light with preferable reflectance. In such a case, the S-polarized light and the P-polarized light are to be mixed with each other in the emission light from the first and the second optical devices, and the combining efficiency is lowered when the combining optical device combines the light input from the first optical device and the light input from the second optical device with each other. In contrast thereto, according to this aspect of the invention, since the polarization directions of the respective light input to the combining optical device can be aligned by providing the first polarization conversion device and the second polarization conversion device as described above, such a problem that the combining efficiency of the light with a specific wavelength is degraded can be eliminated, and the emission light from the respective optical devices are guided along the projection direction with efficiency. Therefore, the combining efficiency in the combining optical device is improved, and the loss of the light intensity in the emission light can be prevented. Further, since the light efficiency is improved, an image with desired brightness can be displayed with a smaller amount of light, and therefore, energy saving in the light source can also be achieved.

According to another aspect of the invention, in the projector of the above aspect of the invention, it is preferable that the first optical device is disposed at a position facing the combining optical device straight in the projection direction, and emits the emission light in a direction the same as the projection direction, and the second optical device is disposed at a position, which faces the combining optical device, and where an emission direction of the emission light is perpendicular to the projection direction.

According to this aspect of the invention, the first optical device is disposed at a position facing straight to the projection direction, and the second optical device is disposed at a position where the emission direction of the emission light is perpendicular to the projection direction. Thus, since the first polarization conversion device aligns the polarization direction of the emission light from the first optical device into the first polarization direction with high transmission in the combining optical device, and the second polarization conversion device aligns the polarization direction of the emission light from the second optical device into the second polarization direction with high reflectance in the combining optical device, the combining optical device can efficiently combine the respective incident light and then project them in the projection direction. Therefore, the loss of the light intensity in the combining optical device can be reduced, and the energy saving of the light source can be achieved.

According to still another aspect of the invention, in the projector of the above aspect of the invention, it is preferable that the combining optical device is a polarizing beam splitter having high transmission of light with a polarization direction of P-polarized light, and high reflectance of light with a polarization direction of S-polarized light, the first polarization conversion device aligns the polarization direction of the emission light from the first optical device into a P-polarization direction, and the second polarization conversion device aligns the polarization direction of the emission light from the second optical device into an S-polarization direction.

According to this aspect of the invention, the first polarization conversion device converts the polarization direction of the emission light, which is emitted from the first optical device having the emission direction of the emission light identical to the projection direction, into the P-polarization direction, and the second polarization conversion device converts the polarization direction of the emission light, which is emitted from the second optical device having the emission direction of the emission light perpendicular to the projection direction, into the S-polarization direction. Further, the polarizing beam splitter transmits the emission light from the first optical device directly in the projection direction, and reflects the emission light emitted from the second optical device toward the projection direction to thereby combine the respective emission light. In other words, the polarizing beam splitter can preferably guide the respective emission light to the projection direction, and can reduce the loss of the light intensity in the emission light.

According to yet another aspect of the invention, in the projector of the above aspect of the invention, it is preferable that the colored light are a red light with a polarization direction of the S-polarized light, a green light with a polarization direction of the P-polarized light, and a blue light with a polarization direction of the S-polarized light, and the color combining optical device is a cross dichroic prism adapted to reflect the red light and the blue light, and transmit the green light to thereby combine the respective colored light.

In this aspect of the invention, the color combining optical device is a cross dichroic prism, and preferably transmits the green light with the polarization direction of the P-polarized light, and preferably reflects the red light and the blue light with the polarization direction of the S-polarized light, thus the color combination can be performed. Therefore, the loss of the light intensity in the cross dichroic prism can be reduced, and it is possible to make the light efficiency more preferable.

According to still yet another aspect of the invention, in the projector of the above aspect of the invention, it is preferable that the first polarization conversion device includes a wavelength selective polarization rotator adapted to selectively rotate the polarization direction of the green light from the P-polarization direction to the S-polarization direction, and a polarization conversion element adapted to convert the polarization direction of each of the colored light emitted from the wavelength selective polarization rotator into the P-polarization direction, and the second polarization conversion device includes a wavelength selective polarization rotator adapted to selectively perform conversion from the P-polarized light to the S-polarized light on the green light.

Specifically, as described above, in the case in which the green light as the P-polarized light is transmitted and the red light and the blue light as the S-polarized light are reflected in the cross dichroic prism, the emission light becomes a mixed light including the light (G) with the polarization direction of the P-polarized light and the light (R, B) with the polarization direction of the S-polarized light mixed with each other. Even in such a case, it is possible for the first polarization conversion device to rotate only the polarization direction of the green light (G) as the P-polarized light 90 degrees using the wavelength selective polarization rotator, thus the polarization direction can be converted from the P-polarization direction to the S-polarization direction. Thus, the polarization direction of the emission light can be aligned to the S-polarization direction. Further, the wavelength conversion element converts the polarization directions of the red light, the green light, and the blue light from the S-polarization direction to the P-polarization direction with higher transmission, and it becomes possible to preferably transmit through the polarizing beam splitter. Meanwhile, in the second polarization conversion device, the wavelength selective polarization rotator rotates the polarization direction of the green light as the P-polarized light into the S-polarization direction to thereby align the polarization direction of the emission light into the S-polarization direction. Thus, the respective polarization directions of the red light, the green light, and the blue light are aligned into the S-polarization direction, and it becomes possible to preferably reflect the light by the polarizing beam splitter. Therefore, the emission light emitted from the respective optical devices can be combined using the polarizing beam splitter without causing the loss of the light intensity.

Further, according to further another aspect of the invention, in the projector of the above aspect of the invention, it is also possible to adopt the configuration in which the first polarization conversion device includes a wavelength selective polarization rotator adapted to selectively rotate the polarization directions of the red light and the blue light from the S-polarization direction to the P-polarization direction, and the second polarization conversion device includes a wavelength selective polarization rotator adapted to selectively rotate the polarization direction of the green light from the P-polarization direction to the S-polarization direction.

According to this aspect of the invention, the first polarization conversion device can selectively rotate polarization of the red light and the blue light as the S-polarized light to convert the S-polarized light into the P-polarized light using the wavelength selective polarization rotator, thereby aligning the polarization direction of the emission light into the P-polarization direction. Therefore, the polarization conversion device used in the above aspects of the invention becomes unnecessary, and the configuration can be further simplified. Further, since the number of optical components through which the emission light is transmitted is decreased, the loss of the light intensity can further be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, the projector according to a first embodiment of the invention will be explained with reference to the accompanying drawings.

Figure 1:
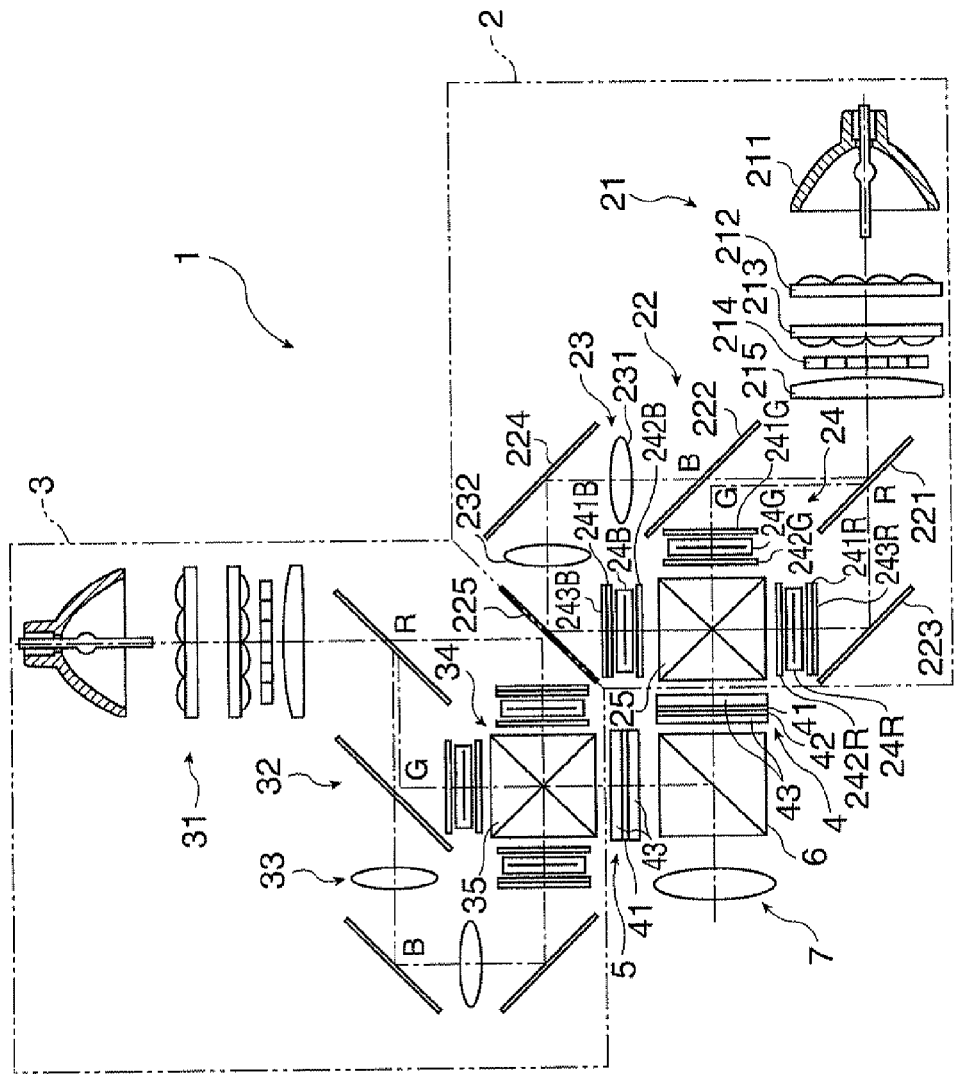
FIG. 1 is a block diagram showing a schematic configuration of an optical system of a projector according to a first embodiment of the invention.

FIG. 1 is a block diagram showing a schematic configuration of an optical device of the projector according to the first embodiment of the invention.

Configuration of Projector

In FIG. 1, the projector 1 is provided with a first optical device 2, a second optical device 3, a first polarization conversion device 4, a second polarization conversion device 5, a combining optical device 6, and a projection optical device 7, and these optical devices are housed in a common housing not shown. Further, the first optical device 2 is disposed inside the housing at a position across the combining optical device 6 from the projection optical device 7, namely a position facing straight to the projection direction of an optical image. In contrast, the second optical device 3 is disposed at a position opposed to the combining optical device 6, and perpendicular to the projection direction. Further, the first polarization conversion device 4 is disposed between the first optical device 2 and the combining optical device 6, and the second polarization conversion device 5 is disposed between the second optical device 3 and the combining optical device 6.

Still further, the projector 1 is for forming the optical image in each of the first optical device 2 and the second optical device 3 in accordance with an image signal input from, for example, an image signal source, then combining the optical images, which are formed in the respective optical devices 2, 3, in the combining optical device 6, and then projecting the optical image, which is obtained by the combining operation, by the projection optical device 7. In such a projector 1 as described above, it becomes possible to slide the optical images respectively output from the first optical device 2 and the second optical device 3, for example, by a half pixel from each other in an oblique direction to thereby display a high-resolution image, or to overlap corresponding pixels of the optical images respectively output from the first optical device 2 and the second optical device 3 to thereby display a high-brightness image.

The first optical device 2 is provided with an illumination optical device 21, a color separation optical device 22, a relay optical device 23, a light modulation device 24, and a color combining optical device 25 forming a first color combining device of the invention. Further, the first optical device 2 is a device for modulating the light, which is emitted from the illumination optical device 21, using the light modulation device 24 in accordance with the image information to thereby form the optical image.

The illumination optical device 21 is provided with a light source device 211, a first lens array 212, a second lens array 213, a polarization conversion element 214, and an overlapping lens 215.

The light source device 211 is provided with a light source lamp and a reflector, and aligns the direction of the radiant light, which is emitted from the light source lamp, in a constant direction using the reflector to emit it therefrom.

The first lens array 212 and the second lens array 213 have a configuration in which the small corresponding lenses thereof are arranged in a matrix, and the first lens array 212 divides the light input from the light source device 211 into a plurality of partial light, and focuses the partial light in the vicinity of the second lens array 213.

The second lens array 213 overlaps the plurality of partial light, which are divided into by the first lens array 212, an image formation area of a liquid crystal panel constituting the first optical device 2 described later in cooperation with the overlapping lens 215 located posteriorly on the light path.

The polarization conversion element 214 is an optical element for converting the light emitted from the second lens array 213 into a substantially single type linearly polarized light, namely the S-polarized light.

The polarization conversion element 214 is a plate like member formed by bonding a plurality of prisms with each other on the oblique planes thereof, each of the prisms having a parallelogram shape with one diagonal angles of 45 degrees and the other diagonal angles of 135 degrees, and a polarization split film and a total reflection mirror are deposited alternately on the interfaces on which the prisms are bonded. Further, on the light exit surface of the polarization conversion element 214, there is disposed a plurality of half wave retardation plates at a predetermined pitch.

The color separation optical device 22 has a function of separating the S-polarized light input therein into three colored light of a red light (R), a green light (G), and a blue light (B), and is provided with dichroic mirrors 221, 222, and reflecting mirrors 223, 224, 225.

The dichroic mirrors 221, 222 are optical elements disposed so as to be tilted approximately 45 degrees with respect to the central axis of the light path of the light emitted from the light source device 211, and each obtained by forming a dielectric multilayer film on a transparent substrate made of, for example, BK7 or quartz glass, and have a function of reflecting the light in a specific wavelength band and transmitting the light in the other wavelength bands, thereby performing the separation into a plurality of colored light. The dichroic mirror 221 disposed anteriorly on the light path transmits the red light (R) and reflects the other colored light, namely the green light (G) and the blue light (B). In contrast, the dichroic mirror 222 disposed posteriorly on the light path reflects the green light (G) and transmits the blue light (B).

The relay optical device 23 is disposed on the light path of the blue light (B) separated by the color separation optical device 22, and the relay optical device 23 is composed of two collecting lenses 231, 232 disposed on the light path, and has a function of guiding the blue light (B) to a liquid crystal panel 24B on the blue light side.

The light modulation device 24 is provided with liquid crystal panels 24R, 24G, 24B as three first light modulation elements, three entrance side polarization plates 241R, 241G, 2416 disposed anteriorly to the respective liquid crystal panels 24R, 24G, 246 on the respective light paths, half wave retardation plates 243R, 243B disposed anteriorly to the respective entrance side polarization plates 241R, 241B on the respective light paths, and three exit side polarization plates 242R, 242G, 242B disposed posteriorly to the respective liquid crystal panels 24R, 24G, 24B on the respective light paths.

The three entrance side polarization plates 241R, 241G, 241B are each configured by forming a polarization film on a transparent substrate made of, for example, BK7 or quartz glass, and absorbs the light with the phases polarized by, for example, the dichroic mirrors 221, 222 disposed midway in the light path. In this case, since the half wave retardation plates 243R, 243B are disposed anteriorly to the respective entrance side polarization plates 241R, 241B on the respective light paths, the polarization directions of the red light (R) and the blue light (B) are rotated, and thus, the red light (R) and the blue light (B) are converted from the S-polarized light into the P-polarized light. Further, the entrance side polarization plates 241R, 241B transmit only the light with the polarization direction of the P-polarized light and absorb the light with other polarization directions. In contrast, the entrance side polarization plate 241G transmits only the light with the polarization direction of the S-polarized light and absorbs the light with other polarization directions.

The liquid crystal panels 24R, 24G, 24B each have a configuration of airtightly encapsulating liquid crystal as an electro-optic material between a pair of transparent glass plates, and modulate the polarization directions of the polarized light emitted from the respective entrance side polarization plates 241R, 241G, 241B in response to the orientation condition being controlled in accordance with the input image information.

The three exit side polarization plates 242R, 242G, 242B transmit only the light with a predetermined polarization direction out of the light emitted via the respective liquid crystal panels 24R, 24G, 24B. Here, the exit side polarization plates 242R, 242B transmit only the light with the polarization direction of the S-polarized light out of the red light (R) and the blue light (B) emitted from the respective liquid crystal panels 24R, 24B, and absorb the other light. In contrast, the exit side polarization plate 242G transmits only the light with the polarization direction of the P-polarized light out of the green light (G) emitted from the liquid crystal panel 24G, and absorbs the other light.

The color combining optical device 25 has a function of combining the modulated light emitted from the respective exit side polarization plates 242R, 242G, 242B to thereby form a color image, and has a roughly square planar shape formed by bonding four rectangular prisms with each other, and is configured as a cross dichroic prism with the interfacial surfaces, on which the rectangular prisms are bonded with each other, provided with two dielectric multilayer films. One of the two dielectric multilayer films has the characteristic of reflecting the red light (R) and transmitting the green light (G), and the other thereof has the characteristic of reflecting the blue light (B) and transmitting the green light (G), and these dielectric multilayer films combine the red light (R), the green light (G), and the blue light (B) to thereby form the color image.

Figure 2:
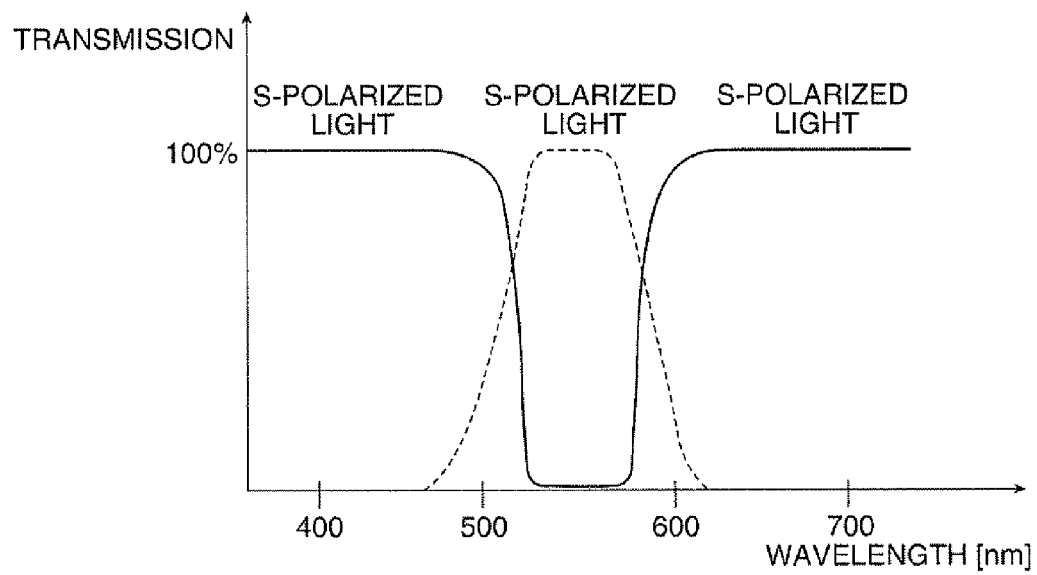
FIG. 2 is a diagram showing the transmission with respect to the wavelength in the case of making a red light, a green light, and a blue light each having a polarization direction of the S-polarized light enter a cross dichroic prism constituting the color combining optical device.
Figure 3:
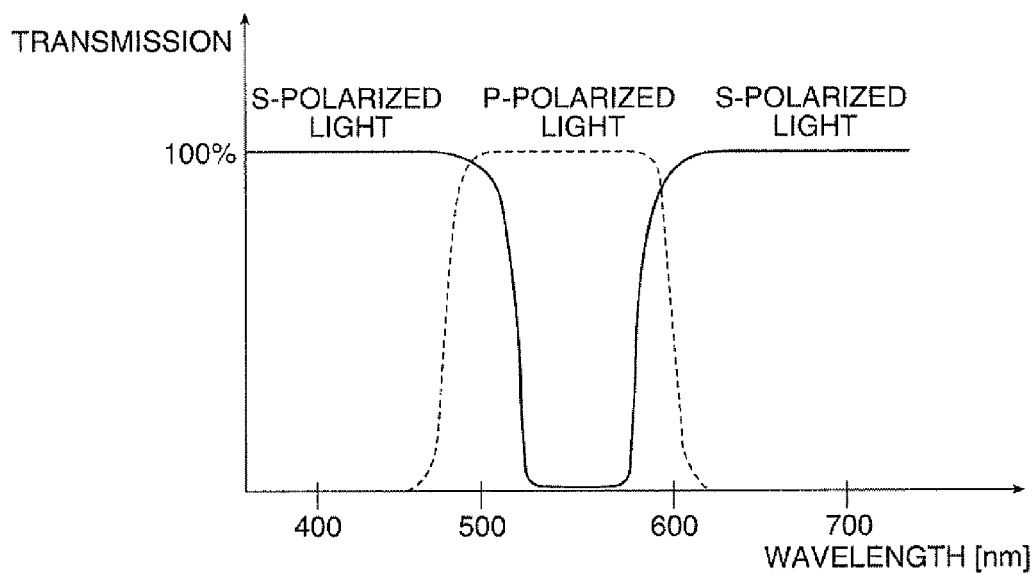
FIG. 3 is a diagram showing the transmission with respect to the wavelength in the case of making a red light (R) and a blue light (B) each having a polarization direction of the S-polarized light and a green light (G) having a polarization direction of the P-polarized light enter the cross dichroic prism shown in FIG. 2.

Here, FIG. 2 is a diagram for showing the transmission with respect to the wavelength in the case in which the S-polarized light are made to enter the cross dichroic prism constituting the color combining optical device 25 of the present embodiment as the red light (R), the green light (G), and the blue light (B), respectively. Further, FIG. 3 is a diagram showing the transmission with respect to the wavelength in the case in which the red light (R) and the blue light (B), which are the S-polarized light, and the green light (G), which is the P-polarized light, are made to enter the cross dichroic prism.

As shown in FIG. 2, in the case of making the S-polarized light enter there as the green light, the transmission efficiency is low, and therefore, the loss of the light intensity in the color combining optical device increases. In particular, since the transmission in the wavelength band around 500 nm and the wavelength band around 600 nm becomes lower, and the color reproducibility might also be degraded, and therefore, the configuration and the process become complicated because, for example, the color correction for compensating the degradation in the color reproducibility needs to be performed. In contrast, as shown in FIG. 3, in the case of making the P-polarized light enter there as the green light, the transmission efficiency of the green light is also improved, thus the loss of the light intensity becomes smaller. Further, since substantially the same transmission is provided with respect to the light of the entire wavelength band, a problem such as the deterioration in color reproducibility does not arise.

In the present embodiment, the red light (R) and the blue light (B) input from the exit side polarization plates 242R, 242B are the S-polarized light, and the green light (G) input from the exit side polarization plate 242G is the P-polarized light. Therefore, as described above, the red light (R) and the blue light (B) are improved in the reflection efficiency in the dielectric multilayer film, and the green light (G) is improved in the transmission efficiency in the dielectric multilayer film. Therefore, as shown in FIG. 3, the loss of the light intensity is not caused, and thus, it becomes possible to preferably generate and then emit the optical image.

The second optical device 3 is provided with an illumination optical device 31, a color separation optical device 32, a relay optical device 33, a light modulation device 34, and a color combining optical device 35 forming a second color combining optical device in basically the same fashion as the first optical device 2, and the configuration, the function, and the action of each of the devices 31, 32, 33, 34, 35 are substantially the same as those in the first optical device 2. It should be noted that although three liquid crystal panels as second light modulation elements of the invention are incorporated in the light modulation device 34, since those having the configurations identical to those of the liquid crystal panels 24R, 24G, 24B as the first light modulation elements described above are used, the explanations therefor will be omitted here.

The first polarization conversion device 4 aligns the polarization direction of the optical image (emitted light), which is emitted from the first optical device 2, into the direction of the P-polarized light easily transmitted through the combining optical device 6. As shown in FIG. 1, the first polarization conversion device 4 is provided with a wavelength selective polarization rotator 41 disposed anteriorly on the light path and a half wave retardation plate 42 as a polarization conversion element disposed posteriorly on the light path. Further, in the first polarization conversion device 4, these optical elements are sandwiched between transparent substrates 43 made of, for example, BK7 or quartz glass with a thickness of about 5 mm, thus the wavelength selective polarization rotator 41 and the half wave retardation plate 42 are held evenly within the surface thereof.

The wavelength selective polarization rotator 41 is an optical element for rotating 90 degrees the polarization direction of the green light (G) out of the optical image input from the first optical device 2. The wavelength selective polarization rotator 41 is an optical element formed of a stretched polymer film made of a polymer material such as polyvinyl alcohol, polycarbonate, polypropylene, polystyrene, triacetate, or polymethylmethacrylate, and is obtained by stacking a plurality of stretched polymer films.

Figure 4:
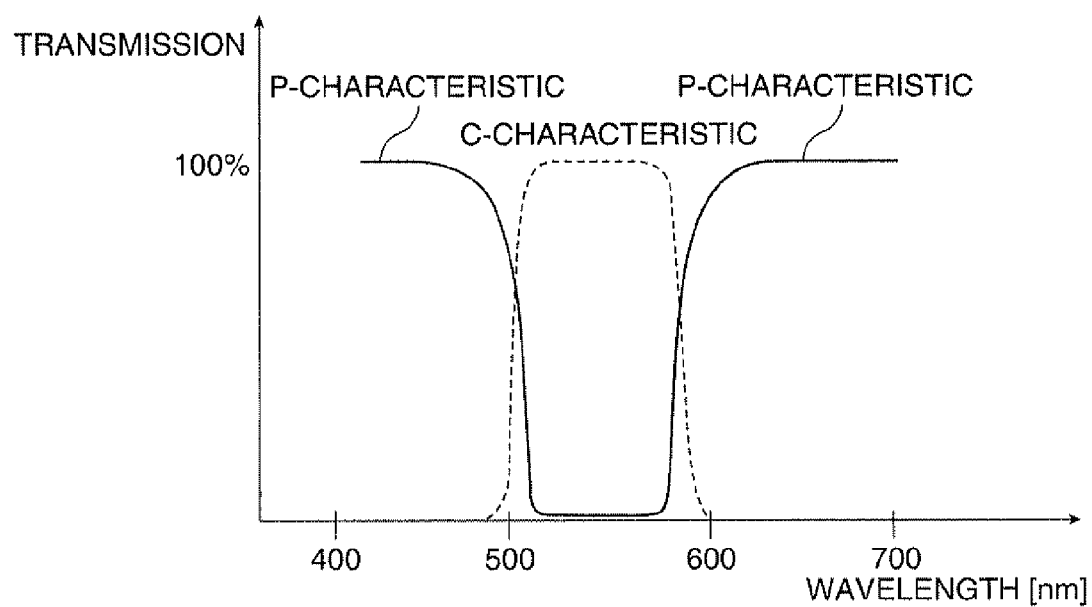
FIG. 4 is a diagram showing the characteristic of a wavelength selective polarization rotator of a first polarization conversion device of the first embodiment.

Here, FIG. 4 shows a diagram representing the characteristic of the wavelength selective polarization rotator 41. In FIG. 4, C-characteristic (cross characteristic) denotes the characteristic of rotating the polarization direction with respect to the incident light, and P-characteristic (parallel characteristic) denotes the characteristic of directly transmitting the incident light without rotating the polarization direction of the incident light. As shown in FIG. 4, the wavelength selective polarization rotator 41 of the first polarization conversion device 4 selects the green light (G) having the wavelength falling within the wavelength range of about 500 nm through about 600 nm out of the optical image output from the first optical device 2, and rotates the polarization direction thereof 90 degrees, thereby converting the P-polarized light into the S-polarized light. Thus, the green light (G) is converted in the polarization direction into the S-polarized light beam similarly to the red light (R) and the blue light (B), and the respective colored light constituting the optical image are aligned in the polarization direction to be the S-polarized light.

The half wave retardation plate 42 further rotates the polarization direction of the optical image to thereby convert the S-polarized light into the P-polarized light. The optical image having the linearly polarization of such a P-polarized light has a high transmission in the combining optical device 6 described later, and is transmitted through the combining optical device 6, and then guided to the projection optical device 7.

The second polarization conversion device 5 aligns the polarization direction of the optical image (emitted light), which is emitted from the second optical device 3, into the direction of the S-polarized light easily reflected by the combining optical device 6. Similarly to the first polarization conversion device 4, the second polarization conversion device 5 is provided with the wavelength selective polarization rotator 41, and is formed by sandwiching the wavelength selective polarization rotator 41 between the transparent substrates made of, for example, BK7 or quartz glass with a thickness of about 5 mm. Since in the second polarization conversion device 5 it is sufficient to align the optical image to be the S-polarized light, the polarization conversion element such as the half wave retardation plate 42 is not provided, and the optical image aligned by the wavelength selective polarization rotator 41 into the S-polarized light is directly emitted toward the combining optical device 6.

The combining optical device 6 is for combining the optical images respectively formed by the first optical device 2 and the second optical device 3, and is a polarizing beam splitter having a substantially square planar shape obtained by bonding two triangular prisms with each other and provided with a dielectric multilayer film formed on the interfacial surface on which the prisms are bonded with each other. The dielectric multilayer film is formed as a polarization split film for transmitting the light with the polarization direction of the P-polarized light and reflecting the light with the polarization direction of the S-polarized light, and transmits the optical image formed by the first optical device 2 reflecting the optical image formed by the second optical device 3, thereby combining the respective optical images.

Although not shown in FIG. 1, the projection optical device 7 is formed of a combination lens composed of a plurality of lenses disposed in a lens tube with optical axes matched with each other, projecting the optical image combined by the combining optical device 6 on a screen.

Functions and Advantages of Projector According to First Embodiment

In such a projector 1 according to the first embodiment as described above, the first optical device 2 is disposed at a position facing straight the projection optical device 7 across the combining optical device 6, and the first polarization conversion device 4 is disposed between the first optical device 2 and the combining optical device 6. Further, the first polarization conversion device 4 aligns the polarization direction of the optical image emitted from the first optical device 2 into that of the P-polarized light. Further, the second optical device 3 is disposed at the position facing the side surface of the combining optical device 6 and perpendicular to the projection direction, and the second polarization conversion device 5 is disposed between the second optical device 3 and the combining optical device 6. Further, the second polarization conversion device 5 aligns the optical image emitted from the second optical device 3 in the polarization direction to be the S-polarized light.

Therefore, the combining optical device 6 can emit the optical image of the P-polarized light with the high transmission, which is input from the first optical device 2, while transmitting it therethrough in the projection direction, and at the same time, emit the optical image of the S-polarized light with the high reflectance, which is input from the second optical device 3, while reflecting it in the projection direction. In other words, by reducing both of the amount of the light of the optical image reflected by the combining optical device 6 out of the optical image emitted from the first optical device 2, and the amount of the light of the optical image transmitted through the combining optical device 6 out of the optical image emitted from the second optical device 3, it is possible to combine the respective optical images and efficiently emit them in the projection direction. Therefore, the loss of the light intensity in the combining optical device 6 can be reduced, and it is possible to display a high-brightness image or a high-resolution image with a small amount of light.

Further, the combining optical device 6 is a polarizing beam splitter having a high transmission with respect to the light with the polarization direction of the P-polarized light and a high reflectance with respect to the light with the polarization direction of the S-polarized light, and the optical image of the P-polarized light is emitted from the first optical device 2 facing straight the projection optical device 7 toward the combining optical device 6, and the optical image of the S-polarized light is emitted from the second optical device 3 toward the combining optical device 6 along the direction perpendicular to the projection direction. Therefore, the combining optical device 6 can preferably emit these optical images to the projection optical device 7 without the loss of the light intensity.

Further, the color combining optical device 25 of each of the optical devices 2, 3 is a cross dichroic prism, and transmits the green light (G) and reflects the red light (R) and the blue light (B) to thereby form the optical image. In this case, the green light (G) with the polarization direction of the P-polarized light is input to the color combining optical device 25, and the red light (R) and the blue light (B) with the polarization direction of the S-polarized light are input thereto. Therefore, in the color combining optical device 25, the optical image corresponding to the image information can faithfully be formed without causing the loss of the light intensity in each of the colored light.

In the optical image emitted from the cross dichroic prism described above, only the green light (G) becomes the P-polarized light, and the red light (R) and the blue light (B) become the S-polarized light. Here, the first polarization conversion device 4 is capable of rotating only the polarization direction of the green light (G) to convert it into the S-polarized light using the wavelength selective polarization rotator 41. Thus, the colored light emitted from the first optical device 2 are aligned in the polarization direction to be the S-polarized light, and further, converted in the polarization direction into the P-polarized light using the half wave retardation plate 42. Therefore, it is possible to input the P-polarized light in the combining optical device 6 as the optical image from the first optical device 2. Meanwhile, the second polarization conversion device 5 is capable of rotating only the polarization direction of the green light (G) to convert it into the S-polarized light using the wavelength selective polarization rotator 41, and thus, all of the colored light is aligned in the polarization direction to be the S-polarized light. Therefore, it is possible to input the S-polarized light in the combining optical device 6 as the optical image from the second optical device 3. In other words, both of the loss of the light intensity in the color combining optical device of each of the optical devices 2, 3 and the loss of the light intensity in the combining optical device 6 can be reduced, and thus, the energy saving can further be advanced.

Second Embodiment

Figure 5:
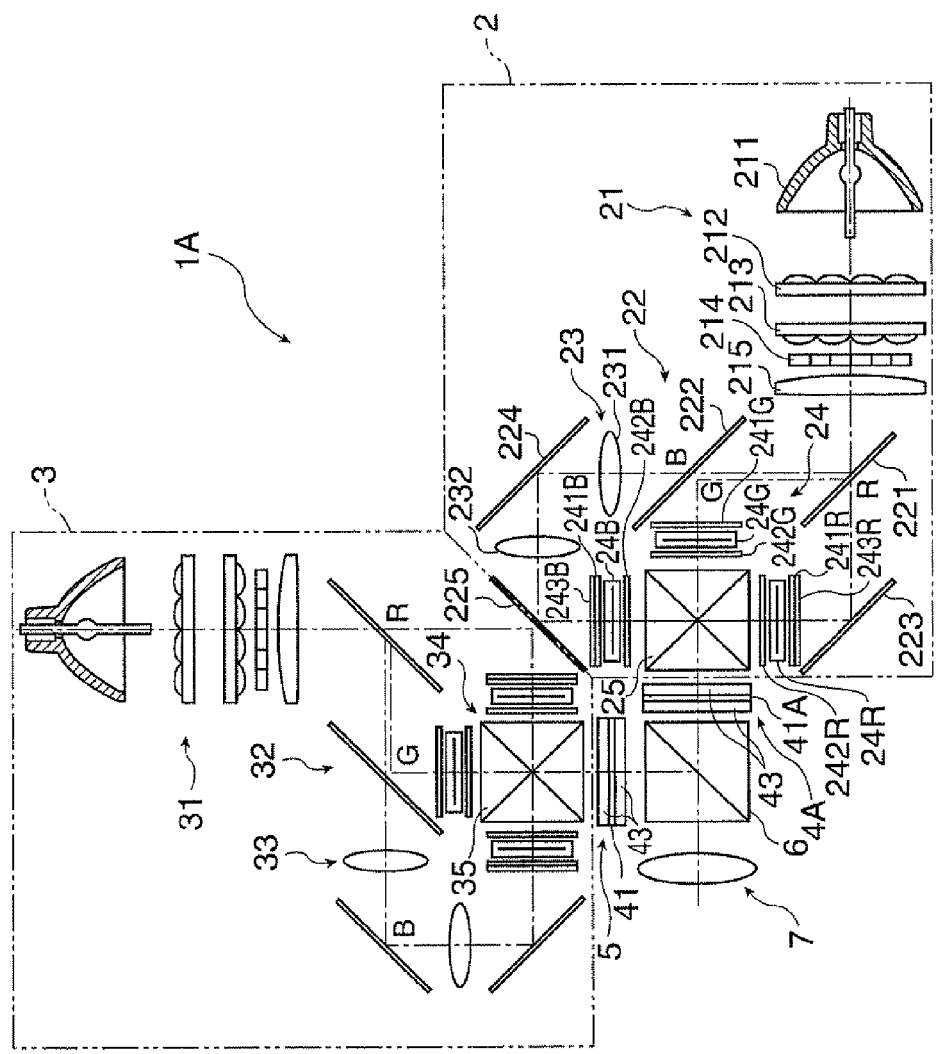
FIG. 5 is a block diagram showing a schematic configuration of an optical system of a projector according to a second embodiment of the invention.
Figure 6:
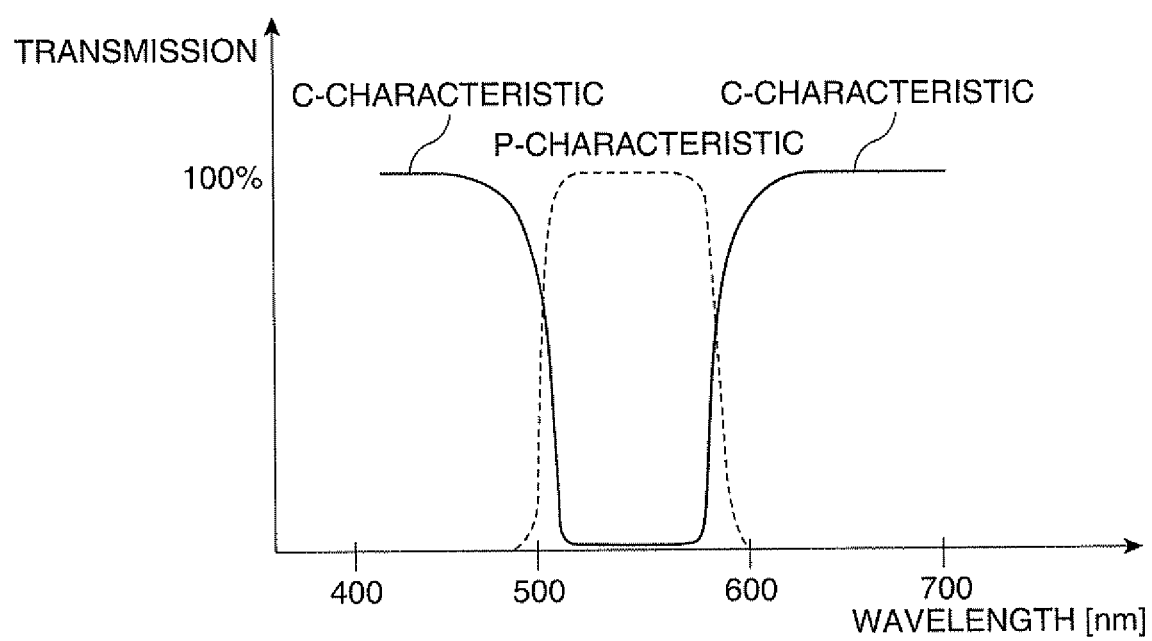
FIG. 6 is a diagram showing the characteristic of a wavelength selective polarization rotator of a first polarization conversion device of the second embodiment.

Then, the projector according to a second embodiment of the invention will be explained with reference to the accompanying drawings. FIG. 5 is a diagram showing a schematic configuration of the projector according to the second embodiment. FIG. 6 is a diagram showing the optical characteristic of the wavelength selective polarization rotator constituting the first polarization conversion device of the second embodiment. It should be noted that in the explanations on and after the present embodiment, the constituents identical to those of the first embodiment will be provided with the same reference symbols, and the explanations therefor will be omitted or simplified.

Configuration of Projector

The second embodiment corresponds to a projector 1A obtained by improving the first polarization conversion device 4 in the projector 1 according to the first embodiment described above, and other constituents, namely the first optical device 2, the second optical device 3, the second polarization conversion device 5, the combining optical device 6, and the projection optical device 7, have the configurations substantially the same as those of the projector 1 according to the first embodiment.

As shown, in FIG. 5, the first polarization conversion device 4A of the projector 1A according to the second embodiment is composed mainly of the transparent substrates 43 and the wavelength selective polarization rotator 41A sandwiched between the transparent substrates 43.

In the first embodiment, as the wavelength selective polarization rotator 41, there is adopted the optical element for rotating the polarization direction of the green light (G) to convert it into the S-polarized light, and directly transmitting the red light (R) and the blue light (B). In contrast, as shown in FIG. 6, the wavelength selective polarization rotator 41A has the cross characteristic with respect to the wavelength band of the red light (R) and the blue light (B) and the parallel characteristic with respect to the wavelength band of the green light (G). Therefore, the red light (R) and the blue light (B) are rotated in the polarization direction from the S-polarized light to the P-polarized light, and the green light (G) is transmitted directly without being rotated in the polarization direction. Thus, the optical image emitted from the first optical device 2 is aligned to be the P-polarized light by the first polarization conversion device 4A.

Functions and Advantages of Second Embodiment

As described above, in the projector 1A according to the second embodiment, the first optical device 2 is disposed at a position facing straight the projection optical device 7 across the combining optical device 6, and the first polarization conversion device 4A is disposed between the first optical device 2 and the combining optical device 6. Further, the first polarization conversion device 4A aligns the polarization direction of the optical image emitted from the first optical device 2 into that of the P-polarized light. Further, the second optical device 3 is disposed at the position facing the side surface of the combining optical device 6 and perpendicular to the projection direction, and the second polarization conversion device 5 is disposed between the second optical device 3 and the combining optical device 6. Further, the second polarization conversion device 5 aligns the polarization direction of the optical image emitted from the second optical device 3 into that of the S-polarized light.

Therefore, similarly to the case of the first embodiment described above, by reducing both of the amount of the light of the optical image reflected by the combining optical device 6 out of the optical image emitted from the first optical device 2, and the amount of the light of the optical image transmitted through the combining optical device 6 out of the optical image emitted from the second optical device 3, it is possible to combine the respective optical images and efficiently emit them in the projection direction. Therefore, the loss of the light intensity in the combining optical device 6 can be reduced, and it is possible to display a high-brightness image or a high-resolution image with a small amount of light.

Further, the first polarization conversion device 4A is provided with the wavelength selective polarization rotator 41A for rotating the polarization direction of the red light (R) and the blue light (B) 90 degrees, and is formed by sandwiching the wavelength selective polarization rotator 41A with the pair of transparent substrates 43

Therefore, the first polarization conversion device 4A can align the polarization direction of the optical image emitted from the first optical device 2 to the P-polarization direction by the wavelength selective polarization rotator 41A alone without requiring the optical element such as the half wave retardation plate 42 used in the first embodiment, thus the configuration can be further simplified. Further, since the number of optical elements disposed in the light path is decreased, the light absorbed or reflected by the optical elements can also be eliminated, thus the loss of the light intensity can be further reduced to thereby advance the energy saving of the projector.

Third Embodiment

Then, a third embodiment of the invention will be explained with reference to the accompanying drawings.

Figure 7:
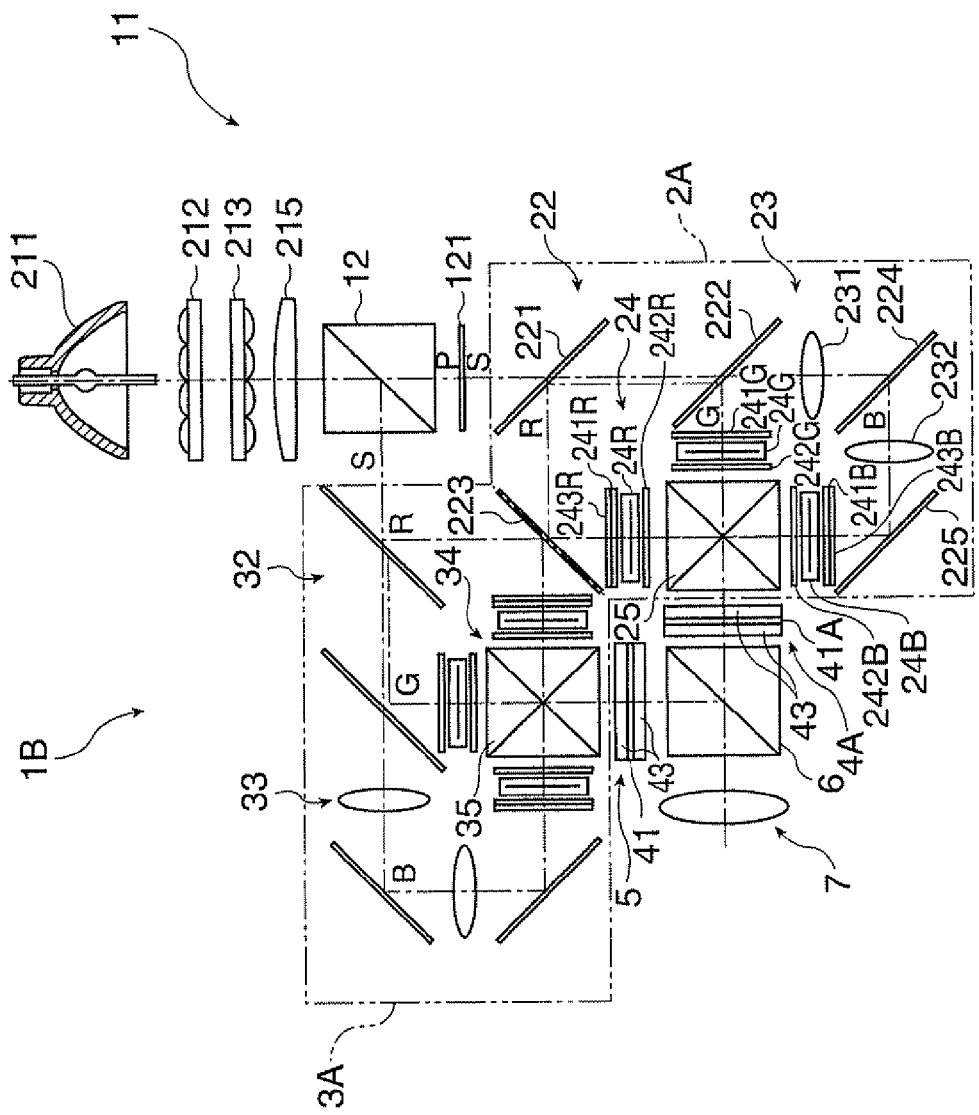
FIG. 7 is a block diagram showing a schematic configuration of an optical system of a projector according to a third embodiment of the invention.

FIG. 7 is a diagram showing a schematic configuration of the projector according to the third embodiment of the invention.

Although in the projectors 1, 1A of the first and the second embodiments described above, there is adopted a configuration of providing the light source device 211 to each of the first optical device 2 and the second optical device 3, a single illumination optical device 11 is used in the third embodiment.

Specifically, as shown in FIG. 7, the projector 1B according to the third embodiment is provided with the illumination optical device 11, a polarization splitting device 12, the first optical device 2A the second optical device 3A, the first polarization conversion device 4A, the second polarization conversion device 5, the combining optical device 6, and the projection optical device 7.

The illumination optical device 11 can adopt the configuration substantially the same as that of the illumination optical device 21 used in the projectors 1, 1A of the first and the second embodiments. The illumination optical device 11 is disposed between the first optical device 2A and the second optical device 3A, and the light emitted from the illumination optical device 11 is split by the polarization splitting device 12 into the S-polarized light and the P-polarized light. It should be noted that since the polarization splitting device 12 splits the light into linearly polarized light respectively having the S-polarization direction and the P-polarization direction, the polarization conversion element 214 is not provided to the light source device 211.

The polarization splitting device 12 is a polarizing beam splitter having the configuration identical to that of the combining optical device 6, and transmits the P-polarized light having high transmission efficiency with respect to the dielectric multilayer film and reflects the S-polarized light having high reflection efficiency with respect to the dielectric multilayer film. Here, the linearly polarized light obtained by the splitting operation are guided respectively to the light modulation device 24 of the first optical device 2A and the light modulation device 34 of the second optical device 3A, and the positions of the polarizing beam splitter and the light source device 211 are arranged so that the optical path lengths thereof become equal to each other.

Further, a half wave retardation plate 121 is disposed so as to face the exit surface of the polarizing beam splitter on the first optical device 2A side thereof. The half wave retardation plate 121 rotates the polarization direction of the light, which is transmitted through the polarizing beam splitter and proceeds toward the first optical device 2A, 90 degrees to thereby convert the P-polarized light into the S-polarized light.

The first optical device 2A has the configuration substantially the same as that of the first optical device 2 in the first and the second embodiments described above except the fact that the light source device 211 is omitted, and is provided with the color separation optical device 22, the relay optical device 23, the light modulation device 24, and the color combining optical device 25.

Further, the second optical device 3A has the configuration substantially the same as that of the first optical device 2A, and is provided with the color separation optical device 32, the relay optical device 33, the light modulation device 34, and the color combining optical device 35, and the configuration, the function, and the action of each of the devices 32, 33, 34, 35 are substantially the same as those in the first optical device 2A.

Such first and second optical devices 2A, 3A emit the optical image in which the red light (R) and the blue light (B) are S-polarized light, and the green light (G) is the P-polarized light in a manner similar to that of the first and second optical devices 2, 3 described above.

The first polarization conversion device 4A and the second polarization conversion device 5 have the configuration substantially the same as the configuration used in the projector 1A according to the second embodiment. Specifically, the first polarization conversion device 4A rotates the red light (R) and the blue light (B) in the polarization direction out of the light emitted from the first optical device 2A to convert it into the P-polarized light using the wavelength selective polarization rotator 41A, and emits the P-polarized light toward the combining optical device 6. The second polarization conversion device 5 rotates only the green light (G) in the polarization direction out of the light emitted from the second optical device 3A to convert it into the S-polarized light. Thus, the polarization directions of the respective colored light are aligned to those of the S-polarized light.

It should be noted that although the configuration of using the first polarization conversion device 4A is shown here as an example, the invention is not limited thereto, but the configuration of using, for example, the first polarization conversion device 4 of the first embodiment can also be adopted.

Functions and Advantages of Third Embodiment

As described above, the projector 1B according to the third embodiment described above can provide the following advantages in addition to the functions and advantages of the first embodiment described above.

Specifically, the projector 1B uses a single illumination optical device 11 as the light source, and splits the light emitted from the illumination optical device 11 into two linearly polarized light using the polarization splitting device 12. Further, the projector 1B emits the P-polarized light out of these two linearly polarized light on the first optical device 2A side, emits the S-polarized light on the second optical device 3A side, and executes the optical process using the first and second optical devices 2A, 3A.

Therefore, since the number of light sources can be reduced with respect to the first and second embodiments described above, the power consumption for lighting the light source can also be reduced. Therefore, energy saving can further be advanced. Further, since it is sufficient to provide the single illumination optical device 11, downsizing of the projector 1B can be achieved compared to the case in which two light sources are provided.

Fourth Embodiment

Then, the projector 1C according to a fourth embodiment of the invention will be explained.

Figure 8:
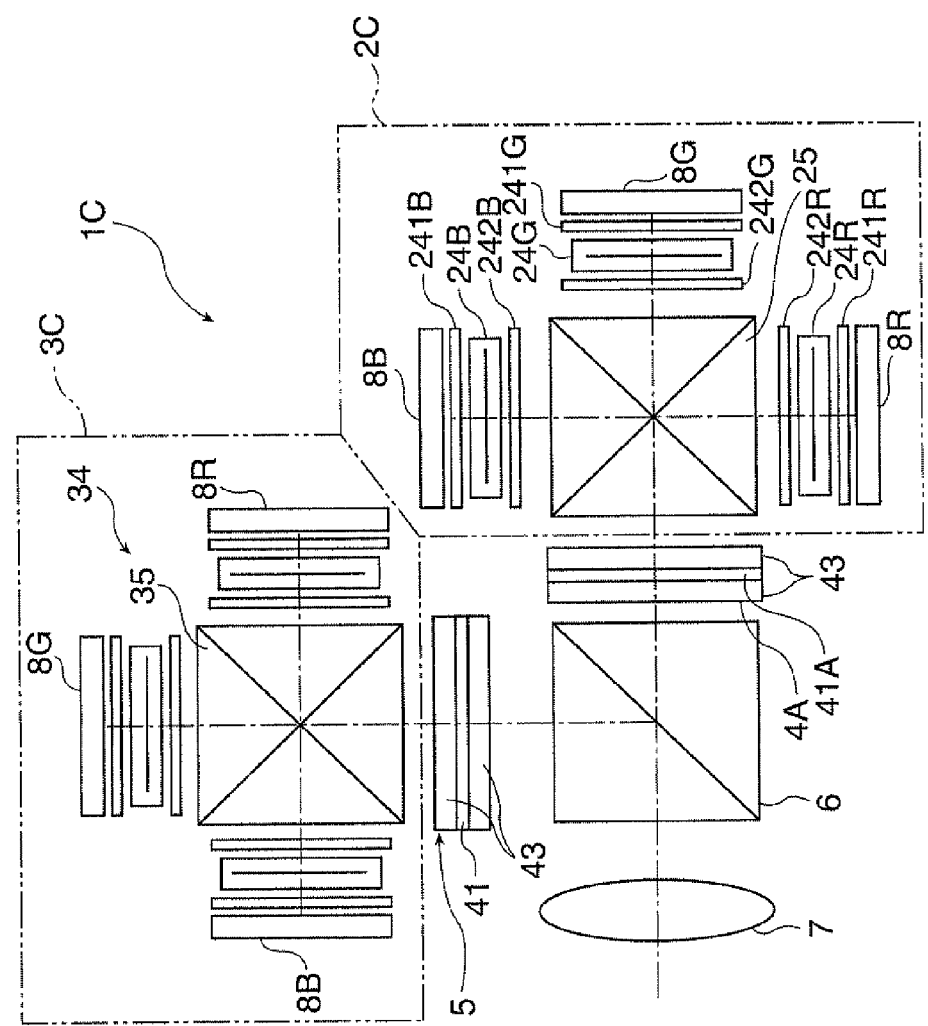
FIG. 8 is a block diagram showing a schematic configuration of an optical system of a projector according to a fourth embodiment of the invention.

FIG. 8 is a diagram showing a schematic configuration of the projector according to the fourth embodiment.

The projector 10 according to the fourth embodiment uses, as the light sources, surface light source devices 8R, 8G, 8B disposed so as to face the respective liquid crystal panels 24R, 24G, 24B, and capable of emitting the colored light corresponding to the respective liquid crystal panels 24R, 24G, 24B.

These surface light source devices 8R, 8G, 8B are each a device having light emitting elements such as light emitting diodes (LED) or semiconductor lasers disposed in a matrix on, for example, a rectangular substrate, and emitting the colored light even within the surface. These surface light source devices 8R, 8G, 8B are disposed at positions facing the entrance surfaces of the respective liquid crystal panels 24R, 24G, 24B of each of the optical devices 2C, 3C, more specifically, in anteriorly stages of the respective entrance side polarization plates 241B, 241G, 241B.

Functions and Advantages of Fourth Embodiment

In the projector 1C according to the fourth embodiment, the surface light source devices 8R, 8G, 8B for emitting colored light corresponding to the respective colors are fixed so as to face the respective liquid crystal panels 24R, 24G, 24B. Therefore, the constituents such as the color separation optical device 22 and relay optical device 23 used in the projectors 1, 1A, 1B according to the first, second, and third embodiments become unnecessary, thus the configuration can be further simplified. Further, since the lengths of the light paths from the light sources to the respective liquid crystal panels 24R, 24G, 24B become shorter, the loss of the light intensity inside the light paths can be reduced, thus the effective utilization of the light emitted from the respective surface light source devices 8R, 8G, 8B can be enhanced.

Other Embodiments

It should be noted that the invention is not limited to the embodiments described hereinabove, but can be improved or modified in various forms within the range in which the advantage of the invention can be obtained.

For example, although in the embodiments there is adopted the configuration of combining the optical images emitted from the pair of optical devices, namely the first optical device 2 (2A, 2C) and the second optical device 3 (3A, 3C), using the combining optical device 6, the invention is not limited thereto. For example, it is also possible to adopt the configuration in which a third optical device is disposed at a position across the combining optical device 6 from the second optical device (3A, 3C), and the optical images respectively emitted from the three optical devices are combined. In this case, by disposing the second polarization conversion device 5 also between the third optical device and the combining optical device 6, the respective colored light of the optical image emitted from the third optical device can be aligned to be the S-polarized light, thus the loss of the light intensity can be reduced.

Although in the fourth embodiment the configuration of disposing the first polarization conversion device 4A is shown in the drawing, the invention is not limited thereto, and it is also possible to adopt the configuration of using the first polarization conversion device 4 similarly to the first embodiment.

Further, although in the above embodiments there is described the example in which each of the optical devices 2, 3 (2A, 3A, 2C, 3C) forms the optical image obtained by combining the red light and the blue light of the S-polarized light and the green light of the P-polarized light, accordingly the first polarization conversion device 4 is provided with the wavelength selective polarization rotator 41 and the half wave retardation plate 42 corresponding only to the green light, the first polarization conversion device 4A is provided with the wavelength selective polarization rotator 41A corresponding to the red light and the blue light, and the second polarization conversion device 5 is formed of the wavelength selective polarization rotator 41 corresponding only to the green light, the invention is not limited thereto. Specifically, these polarization conversion devices 4, 4A, 5 can appropriately be determined in accordance with the polarization directions of the respective colored light in the optical image emitted from the respective optical devices 2, 3 (2A, 3A, 2C, 3C), and for example, in the case in which the optical image having the red light of the P-polarized light and the green and blue light of the S-polarized light is emitted, the wavelength selective polarization rotator for rotating only the polarization direction of the red light, or the wavelength selective polarization rotator for rotating the polarization directions of the blue and green light can be used.

Although the best configurations for putting the invention into practice are hereinabove explained specifically, the invention is not limited thereto. In other words, although the invention is particularly illustrated and described with respect mainly to specific embodiments, those skilled in the art can apply various modifications and improvements to the embodiments described above within the scope, the spirit, the technical concepts, or the object of the invention.

The present invention can be applied to a projector provided with two or more optical devices, and combining the light emitted from the respective optical devices to thereby display an image.

The entire disclosure of Japanese Patent Application No. 2009-048911, filed Mar. 3, 2009 is expressly incorporated by reference herein.

What is claimed is:

1. A projector comprising:
a first optical device having a plurality of first light modulation elements adapted to modulate a plurality of colored light, and a first color combining optical device adapted to combine the colored light modulated by the respective first light modulation elements;
a second optical device having a plurality of second light modulation elements adapted to modulate a plurality of colored light, and a second color combining optical device adapted to combine the colored light modulated by the respective second light modulation elements;
a combining optical device adapted to combine emission light emitted respectively from the first optical device and the second optical device to thereby emit a combined light in a projection direction;
a first polarization conversion device disposed between the first optical device and the combining optical device, and adapted to align a polarization direction of the emission light from the first optical device into a first polarization direction;
a second polarization conversion device disposed between the second optical device and the combining optical device, and adapted to align a polarization direction of the emission light from the second optical device into a second polarization direction;

at least three first light modulation elements and at least three second light modulation elements, wherein each of the first and second light modulation elements include an entrance side polarization plate and an exit side polarization plate; and a plurality of half wave retardation plates, the half wave retardation plates being disposed anteriorly to at least two of the entrance side polarization plates of each of the first and second light modulation elements, the first polarization conversion device being disposed between the first color combining optical device of the first optical device and the combining optical device, and the second polarization conversion device being disposed between the second color combining optical device of the second optical device and the combining optical device.

2. The projector according to claim 1, wherein the first optical device is disposed at a position facing the combining optical device straight in the projection direction, and emits the emission light in a direction the same as the projection direction, and the second optical device is disposed at a position, which faces the combining optical device, and where an emission direction of the emission light is perpendicular to the projection direction.

3. The projector according to claim 1, wherein the combining optical device is a polarizing beam splitter having high transmission of light with a polarization direction of P-polarized light, and high reflectance of light with a polarization direction of S-polarized light, the first polarization conversion device aligns the polarization direction of the emission light from the first optical device into a P-polarization direction, and the second polarization conversion device aligns the polarization direction of the emission light from the second optical device into an S-polarization direction.

4. The projector according to claim 3, wherein the colored light are a red light with a polarization direction of the S-polarized light, a green light with a polarization direction of the P-polarized light, and a blue light with a polarization direction of the S-polarized light, and the color combining optical device is a cross dichroic prism adapted to reflect the red light and the blue light, and transmit the green light to thereby combine the respective colored light.

5. The projector according to claim 4, wherein the first polarization conversion device includes a wavelength selective polarization rotator adapted to selectively rotate the polarization direction of the green light from the P-polarization direction to the S-polarization direction, and a polarization conversion element adapted to convert the polarization direction of each of the colored light emitted from the wavelength selective polarization rotator into the P-polarization direction, and the second polarization conversion device includes a wavelength selective polarization rotator adapted to selectively perform conversion from the P-polarized light to the S-polarized light on the green light.

6. The projector according to claim 4, wherein the first polarization conversion device includes a wavelength selective polarization rotator adapted to selectively rotate the polarization directions of the red light and the blue light from the S-polarization direction to the P-polarization direction, and the second polarization conversion device includes a wavelength selective polarization rotator adapted to selectively rotate the polarization direction of the green light from the P-polarization direction to the S-polarization direction.

7. The projector according to claim 1, wherein each of the first and second light modulation elements is disposed between the entrance side polarization plate and the exit side polarization plate of each of the first and second light modulation elements.

\* \* \* \* \*